Sept. 29, 1936. P. H. STANLEY ET AL 2,055,637
ZERO THRUST INDICATOR
Filed March 10, 1932
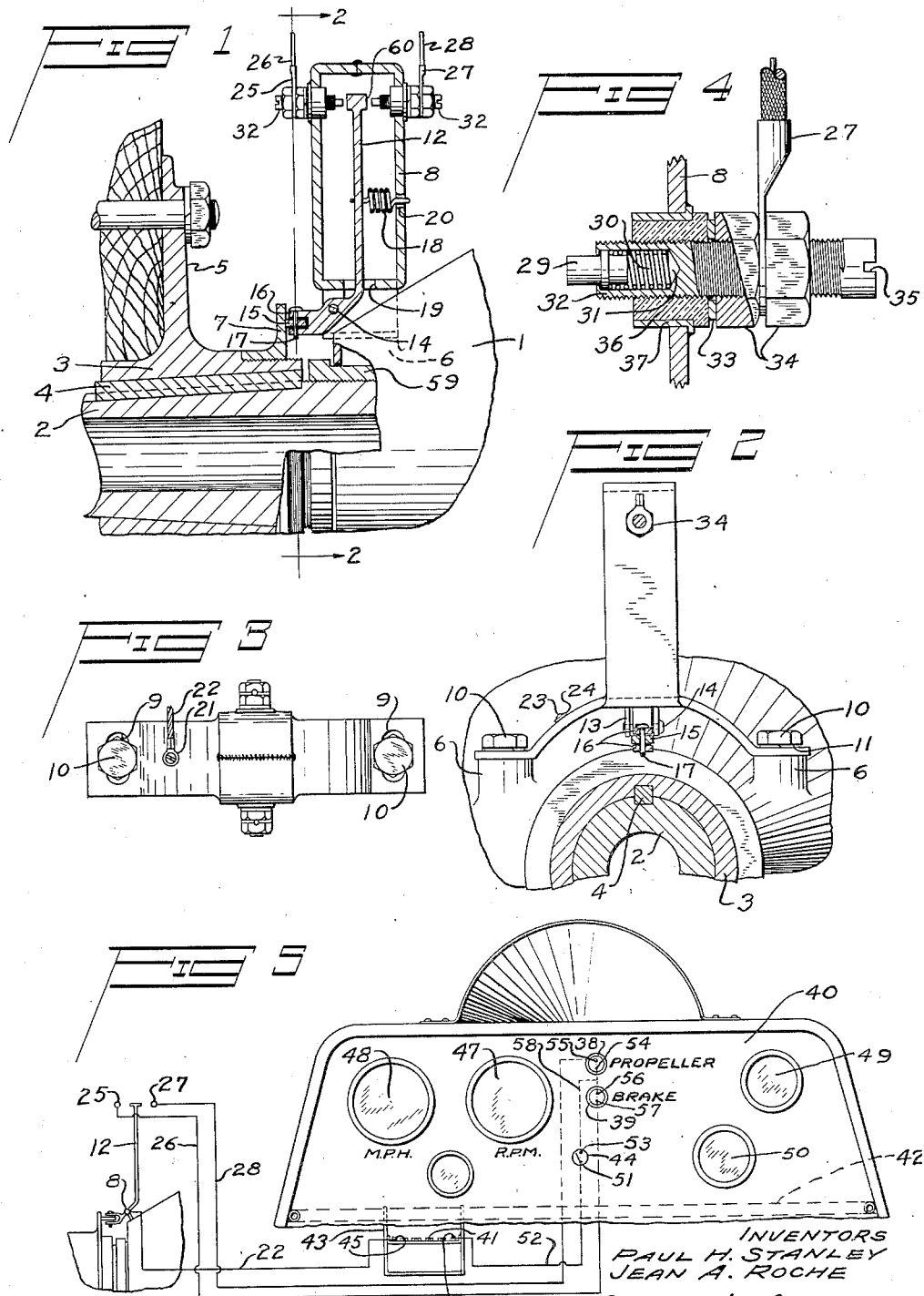
INVENTORS
PAUL H. STANLEY
JEAN A. ROCHE
BY Francis H. Vanderwerker
and Wade Koontz
ATTORNEYS Patented Sept. 29, 1936

2,055,637

UNITED STATES PATENT OFFICE 2,055,637

ZERO THRUST INDICATOR

Paul H. Stanley, Willow Grove, Pa., and
Jean A. Roche, Dayton, Ohio

Application March 10, 1932, Serial No. 598,056

5 Claims. (Cl. 177—311)

This invention relates to an apparatus utilized during the performance test of aircraft.

It is well known to the art that one of the important items obtained during performance test of aircraft is that of total parasite resistance, i. e., that resistance which is due to parts of the airplane other than the wings themselves. It is also noteworthy that this item can only be accurately determined when the propeller or propellers of an aircraft neither aid nor hinder the forward movement of the aircraft.

It is common practice for pilots to fly aircraft undergoing determination of total parasite resistance in accordance with predetermined schedules of air-speeds and engine revolutions based on the design characteristics of the propeller or propellers with which an airplane or airship is equipped. The results obtained by the above method are not altogether satisfactory as they are considerably influenced by fuselage interference in the case of single engined airplanes and by flight variations from the above-mentioned schedules in the cases of both the airplane and the airship.

In the manufacture of aircraft engines it is also well known to the art that a certain amount of end play is allowed in the crankshafts of engines. It is thus possible to slightly vary the distance of the rear flange of a propeller hub from a fixed point of reference established upon the forward end of an engine crank case.

The normal thrust of the propeller or propellers of an airplane undergoing sustained level or climbing flight will cause the propeller hub or hubs to assume a maximum position forward of the aforementioned fixed point of reference. If, however, the attitude of the airplane is changed to one of gliding flight and the engine revolutions gradually decreased, the thrust of the propeller or propellers will gradually decrease until a condition known to the art as "zero thrust" is obtained. At this point the propeller hub or hubs may remain in the aforementioned maximum forward position or they may commence to assume varying rearward or forward positions. If the engine revolutions are still further reduced, the propeller or propellers will gradually commence to drive the idling engine or engines, which will cause the propeller hub or hubs to assume a minimum position forward of the aforementioned fixed point of reference.

Under conditions of zero propeller thrust an airplane is sustained in steady flight by the lift of its wings and by its total parasite resistance. The magnitude of the latter may be calculated from a series of gliding tests at predetermined gliding angles, since the weight of the airplane is a constant and the lift is a function of constant area, known air-speeds and known gliding angles. In the case of the airship, which may be readily held in a weightless state of static equilibrium, it is necessary only to note retardation of air-speed for given time intervals after sudden power-off in order to calculate total parasite resistance.

From the above it will be seen that the present method of determining the total parasite resistance of aircraft is not altogether satisfactory, that the crank-shafts of aircraft engines are manufactured with certain amounts of fore-and-aft play, that during gliding flight of aircraft appreciable variations in power-on or off will result in appreciable fore-and-aft movement of the engine crank-shaft and corresponding movement of the rear face of the propeller hub or hubs and that a serious need exists for a means which will indicate when the propeller or propellers of an aircraft are in a state of zero thrust.

It is an object of this invention to provide a simple and practical apparatus which will fulfill the requirements of the means sought above.

It is a further object of this invention to provide an apparatus which will require a minimum of work to effect proper installation upon the aircraft undergoing test.

It is a still further object of this invention to provide an apparatus so simple in its operation that the indicating element of the apparatus will require a minimum of the pilot's attention during the period of test data recording.

With the foregoing and other objects in view, which will appear as the description proceeds, the invention consists of certain novel arrangements of parts which will be hereinafter more fully illustrated and described in the accompanying drawing and more particularly pointed out in the amended claims.

Referring to the drawing, in which numerals of like character designate similar parts throughout the several views:

Fig. 1 is a side view of a measuring element mounted on the forward end of an engine crank case. The measuring element is shown in contact with a flange installed upon the rear portion of a propeller hub;

Fig. 2 is an end view of the measuring elements showing the method of attachment to the crank case;

Fig. 3 is a partial plan view of the measuring element showing fore-and-aft adjusting means;

Fig. 4 is an enlarged cross-section of a measuring element contactor point assembly; and Fig. 5 is a diagrammatical view of a pilot's instrument board, including a wiring system by which the measuring and indicating elements of this invention are interconnected.

From the above figures it will be seen that this invention consists of two remotely located elements connected together by means of a suitable wiring system. Where aircraft are powered by more than one engine this invention consists of two elements per engine connected together by a corresponding member of wiring systems. The element installed upon the engine or engines is designated a measuring element for the reason that it measures predetermined fore-and-aft travel of the propeller hub with respect to a fixed point of reference established upon the crank case. The element installed upon the pilot's instrument board is designated an indicating element for the reason that it indicates when the propeller hub is in the process of reaching or has actually reached forward or rearward travel with respect to the aforementioned fixed point of reference.

In Fig. 1 the forward portions of a crank case 1 acting as a support for a crank-shaft 2, the rear portion of a propeller hub 3 and a propeller hub locking key 4 are shown in cross-section. Because of the distance between the rear face of a flange 5 of the propeller hub 3 and mounting bosses 6 of the crank case 1, an auxiliary flange 7 forming a surface of reference normal to the crank-shaft 2 has been fixedly secured to the rear end of the propeller hub 3.

In Figs. 1 through 3, a housing 8 is shown adjustably secured to the mounting bosses 6 of the crank case 1 by means of slotted holes 9, cap screws 10 and lock washers 11. A member 12 is pivotally secured to bosses 13 of the bracket 8 by means of a pin 14. The longitudinal axis of the pin 14 is assumed to be the fixed point of reference hereinabove noted as established upon the crank case 1. A roller 15 is pivotally secured to forked ends 16 of the member 12 by means of a pin 17. It is obvious that applicants can readily adapt the member 12 to slide longitudinally (not shown) in lieu of pivotation about the pin 14. In such event the upstanding arm of the member 12 is at all times normal to the crank-shaft 2.

The roller 15 is held in continuous contact with the rear face of the flange 7 by means of a spring 18, one end of which is hooked about that portion of the member 12 which passes upward through a hole 19 in the housing 8. The other end of the spring 18 is hooked through holes 20 of the housing 8. In the event the member 12 is made slidable (not shown) with reference to the housing 8, the holes 20 must be transferred to the forward face of the housing 8. A terminal 21 of an electric wire 22 is shown rigidly secured to the housing 8 by means of a screw 23 and a lock washer 24. Two contactor point assemblies are shown mounted at the upper portion of the housing 8. Terminals 25 and 27 of electric wires 26 and 28 are fixedly secured to the contactor point assemblies as shown.

In Fig. 4, a contactor point 29 and a compression spring 30 are shown assembled within a chamber 31 of a screw 32 in such manner that the contactor point 29 is free to move inwardly against the spring 30, but is restrained from escapement or outward movement by the inwardly turned portion of the chamber 31. A washer 33, nuts 34, and the terminal 27 are first loosely assembled upon the screw 32 by means of a screw driver slot 35 and then screwed fast and locked to an insulator 36 by means of the nuts 34. The insulator 36 is shown fixedly attached to a retaining collar 37 which has previously been fixed to the housing 8.

In Fig. 5, instrument board electric lamps 38 and 39 are shown mounted upon a pilot's instrument board 40. To the right of the lamp 38 is a printed sign reading "propeller" and to the right of the lamp 39 is a printed sign reading "brake". By properly adjusting hooded reflectors attached to the lamps 38 and 39, light rays may be directed from the lamp 38 directly upon the sign "propeller" and may similarly be directed from the lamp 39 directly upon the sign "brake". A battery 41 is secured to a fuselage cross member 42 by means of a suitable bracket 43. An electric switch 44 is mounted upon the board 40, above and to the right of battery terminals 45 and 46. There are also mounted upon the board 40 a tachometer 47, an air-speed indicator 48, an oil thermometer 49, and a fuel gauge 50.

The terminal 45 of the battery 41 is shown grounded to the housing 8 by means of the terminal 21 and the wires 22 shown in Figs. 2 and 3. The other terminal 46 of the battery 41 is connected to a terminal 51 of the switch 44 by means of a wire 52. Another terminal 53 of the switch 44 is connected jointly to terminals 54 and 56 of the lamps 38 and 39 by means of a wire 58. A terminal 55 of the lamp 38 is connected to the right-hand contactor point assembly shown in Fig. 1 by means of the wire 28 and terminal 27. A terminal 57 of the lamp 39 is connected to the left-hand contactor point assembly shown in Fig. 1 by means of the wire 26 and the terminal 25.

Prior to installation of the engine or engines in an aircraft about to undergo performance test, a careful check of the end play in the forward portion of the crank-shaft is accomplished. In engines similar to the type shown in Fig. 1, an end play of twenty-thousandths of an inch may be safely adjusted for by means similar in nature to locking ring 59. After accomplishment of the aforementioned adjustment, including placement of the crank-shaft half way between full forward and full rearward movement, the measuring device of the invention is loosely secured to the engine crank case by means of the lugs 6, the cap screws 10 and the lock washers 11. The roller 15 of the abovementioned device is next placed in contact with the rear face of the flange 7, and the element gently pressed against the flange 7 until upper extremity 60 of the contactor 12 lies equidistantly between the inner extremities of the screws 32. The measuring device is then fixedly attached to the crank case 1.

After installation of the aforementioned engine in an aircraft about to undergo performance test, hand rotation of the propeller in which pull away from the crank case is exerted will cause the rear face of the flange 7 to move a maximum horizontal distance to the left, as viewed in Fig. 1, of the fixed point of reference represented by the pin 14. With the aforementioned propeller rotation the upper extremity 60 of the member 12 will simultaneously move a maximum horizontal distance to the right, as viewed in Fig. 1, of a vertical plane of reference passed through the longitudinal axis of the pin 14 normal to the longitudinal axis of the crank-shaft 2. It is thus possible to so adjust the right-hand contactor point assembly that the contactor point 29 is depressed against the spring 30 any desired amount of the final stages of forward crank-shaft travel. If the toggle switch 44, shown in Fig. 5, is closed during the aforementioned final stage of travel, the lamp 38 will become illuminated, due to closing of the electric circuit, also shown in Fig. 5. During steady sustained or climbing flight, the above propeller positioning obtains and the sign "propeller" is illuminated whenever the toggle switch 44 is closed, indicating to the pilot that the propeller is delivering thrust.

Hand rotation of the propeller in which pressure towards the crank case is exerted will cause the rear face of the flange 7 to assume a position of minimum horizontal distance from the aforementioned plane of reference passed through the pin 14. If adjustment of the left-hand contactor point assembly has been accomplished in a manner similar to that outlined above for the right-hand contactor point assembly, as viewed in Fig. 1, and the aircraft undergoing performance test is placed in an attitude of gliding flight, with engine or engines at minimum throttle, the sign "brake" will be illuminated whenever the toggle switch 44 is closed, indicating to the pilot that the propeller connected to that switch is not only no longer delivering thrust, but that it is actually retarding the forward movement of the aircraft. If the abovementioned switch is left in the closed position and the throttle of the engine connected to the switch is gradually opened, illumination of the sign "brake" will cease as the propeller passes from a state of retarding action to a state of "zero" retarding action. In the event opening of the throttle is continued the sign "propeller" will become illuminated when the propeller commences to deliver thrust. The pilot is thus provided with a simple yet accurate means for maintaining proper throttle settings during those periods of performance testing in which data are being obtained for the calculation of the total parasite resistance of an aircraft.

We claim:

1. In a mechanism for indicating zero thrust in an aircraft propeller during flight, an engine crankshaft including a propeller fixed thereto having a surface of reference normal to said crankshaft, a supporting crankcase permitting free rotational and limited longitudinal movement of said shaft-propeller unit with respect to its support, a housing carried by said crankcase and including spaced contact points oppositely disposed, an L-shaped member movably attached to said housing and comprising a horizontal and a vertical arm, means for holding the open end of said horizontal arm in operable engagement with said surface of reference, the open end of said vertical arm being of a width interposable between but not simultaneously touching said contact points such that longitudinal movement of said surface of reference will effect contact between the open end of said vertical arm and one or the other of said contact points, and two signaling circuits connecting said L-shaped member to each of said contact points for indicating contact between the open end of said vertical arm and one or the other of said contact points.

2. In a mechanism for indicating zero thrust in an aircraft propeller during flight, an engine crankshaft including a propeller fixed thereto having a surface of reference normal to said crankshaft, a supporting crankcase permitting free rotational and limited longitudinal movement of said shaft-propeller unit with respect to its support, a housing carried by said crankcase and having fore and aft walls provided with spaced contact points oppositely disposed, an L-shaped member movably attached to said housing and comprising a horizontal and a vertical arm, means for holding the open end of said horizontal arm in operable engagement with said surface of reference and the open end of said vertical arm being of a width interposable between but not simultaneously touching said contact points such that longitudinal movement of said surface of reference will effect contact between the open end of said vertical arm and one or the other of said contact points, means for longitudinally adjustably securing said housing to said crankcase for advancing or retarding contact between either of said contact points and the open end of the aforesaid vertical arm, electrical signaling means connected with one of said contact points and said L-shaped member for indicating engagement or disengagement of the open end of the vertical arm of said L-shaped member and the aforesaid contact point, and electrical signaling means connected with the other of said contact points and said L-shaped member for indicating engagement or disengagement of the open end of the vertical arm of said L-shaped member and the last mentioned contact point.

3. In a mechanism for indicating zero thrust in an aircraft propeller during flight, an engine crankshaft including a propeller fixed thereto having a surface of reference normal to said crankshaft, a supporting crankcase permitting free rotational and limited longitudinal movement of said shaft-propeller unit with respect to its support, a housing carried by said crankcase and having vertical fore and aft walls each provided with a contact point disposed normal thereto, said contact points being in spaced coaxial relationship and each independently longitudinally adjustable with respect to its supporting wall, an L-shaped member movably attached to said housing and comprising a horizontal and a vertical arm, means for holding the open end of said horizontal arm in operable engagement with said surface of reference and the open end of said vertical arm being of a width interposable between but not simultaneously touching said contact points such that longitudinal movement of said surface of reference will effect contact between the open end of said vertical arm and one or the other of said contact points, means for longitudinally adjustably securing said housing to said crankcase for advancing or retarding contact between either of said contact points and the open end of the aforesaid vertical arm, electrical signaling means connected with one of said contact points and said L-shaped member for indicating engagement or disengagement of the open end of the vertical arm of said L-shaped member and the aforesaid contact point, and electrical signaling means connected with the other of said contact points and said L-shaped member for indicating engagement or disengagement of the open end of the vertical arm of said L-shaped member and the last mentioned contact point.

4. In a mechanism for indicating zero thrust in an aircraft propeller during flight, an engine crankshaft including a propeller fixed thereto having a surface of reference normal to said crankshaft, a supporting crankcase permitting free rotational and limited longitudinal movement of said shaft-propeller unit with respect to its support, a housing carried by said crankcase and having vertical fore and aft walls each provided with a contact point disposed normal thereto, said contact points being in spaced coaxial relationship and each independently longitudinally adjustable with respect to its supporting wall, an L-shaped member pivotally secured to said housing and comprising a horizontal and a vertical arm, the open end of said horizontal arm terminating in a roller, means for maintaining operable engagement between said roller and said surface of reference, the open end of said vertical arm being of a width interposable between but not simultaneously touching said contact points such that longitudinal movement of said surface of reference will effect contact between the open end of said vertical arm and one or the other of said contact points, means for longitudinally adjustably securing said housing to said crankcase for advancing or retarding contact between either of said contact points and the open end of the aforesaid vertical arm, electrical signaling means connected with said forward contact point and said L-shaped member for indicating engagement or disengagement of the open end of the vertical arm of said L-shaped member and the aforesaid contact point, and electrical signaling means connected with said aft contact point and said L-shaped member for indicating engagement or disengagement of the open end of the vertical arm of said L-shaped member and the said last-mentioned contact point.

5. In a mechanism for indicating zero thrust in an aircraft propeller during flight, an engine crankshaft including a propeller fixed thereto having a surface of reference normal to said crankshaft, a supporting crankcase permitting free rotational and limited longitudinal movement of said shaft-propeller unit with respect to its support, a housing carried by said crankcase and having vertical fore and aft walls each provided with a contact point disposed normal thereto, said contact points being in spaced coaxial relationship and each independently longitudinally adjustable with respect to its supporting wall, an L-shaped member pivotally secured to said housing and comprising a horizontal and a vertical arm, the open end of said horizontal arm terminating in a roller and the open end of said vertical arm being of a width interposable between but not simultaneously touching said contact points such that longitudinal movement of said surface of reference will effect contact between the open end of said vertical arm and one or the other of said contact points, spring means for maintaining constant engagement between said roller and said surface of reference, means for longitudinally adjustably securing said housing to said crankcase for advancing or retarding contact between either of said contact points and the open end of the aforesaid vertical arm, electrical signaling means connected with said forward contact point and said L-shaped member for indicating engagement or disengagement of the open end of the vertical arm of said L-shaped member and the aforesaid contact point, and electrical signaling means connected with said aft contact point and said L-shaped member for indicating engagement or disengagement of the open end of the vertical arm of said L-shaped member and the said last-mentioned contact point.

PAUL H. STANLEY.
JEAN A. ROCHE.